(No Model.)
A. B. RICHARDSON.
Device for Soldering Cans.
No. 232,065. Patented Sept. 7, 1880.
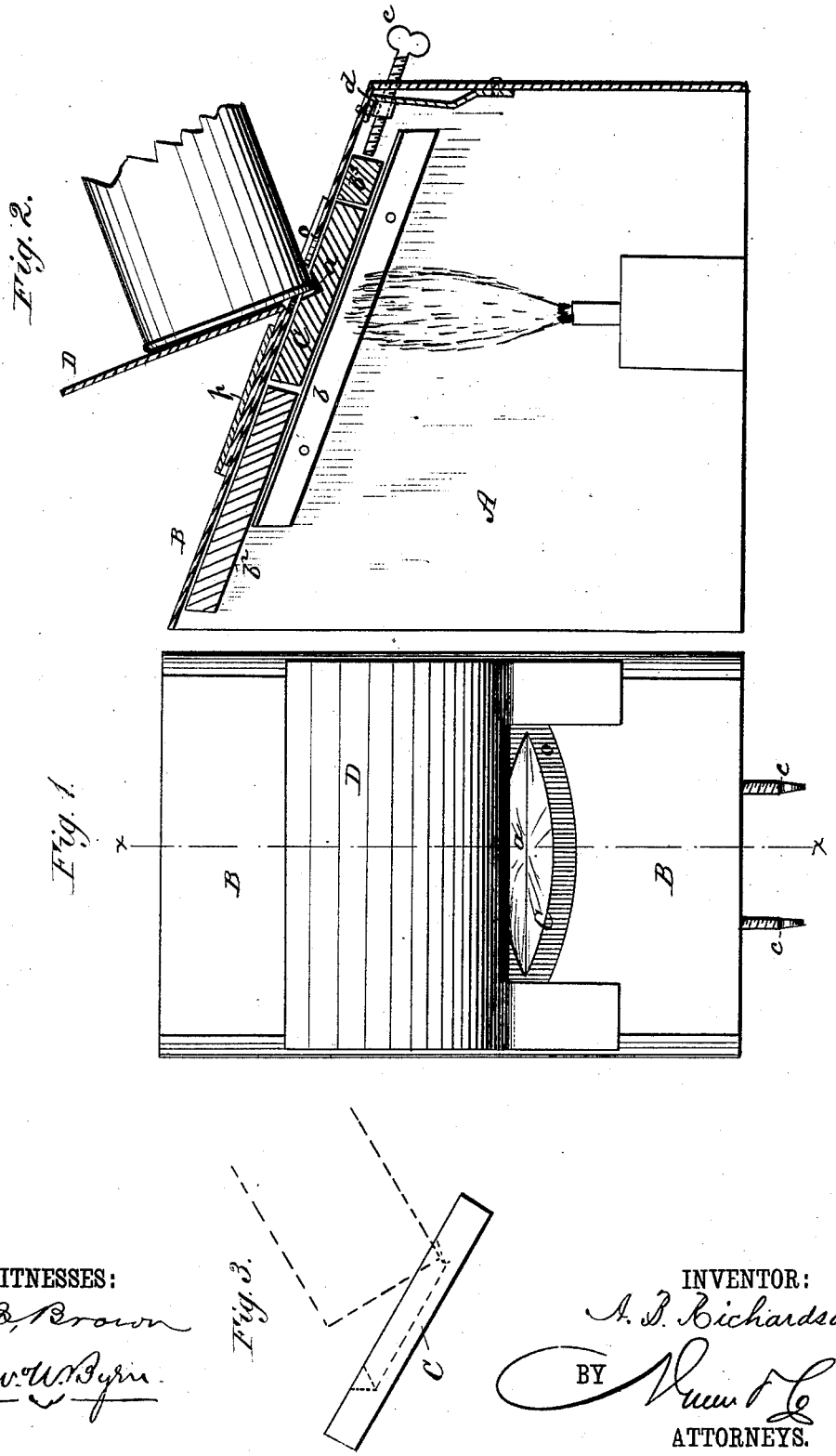
WITNESSES:
INVENTOR:
A. B. Richardson
BY
ATTORNEYS.

UNITED STATES PATENT OFFICE.

ALDEN B. RICHARDSON, OF DOVER, DELAWARE.

DEVICE FOR SOLDERING CANS.

SPECIFICATION forming part of Letters Patent No. 232,065, dated September 7, 1880.

Application filed July 16, 1880. (No model.)

*To all whom it may concern:*

Be it known that I, ALDEN B. RICHARDSON, of Dover, in the county of Kent and State of Delaware, have invented a new and Improved Device for Soldering Cans; and I do hereby declare that the following is a full, clear, and exact description of the same, reference being had to the accompanying drawings, forming part of this specification, in which—

Figure 1 is a plan view. Fig. 2 is a vertical section through the line $x\ x$. Fig. 3 is a detail, illustrating the wear of the copper block.

My invention relates to an improved device for soldering tin cans. It is an improvement on that form of device shown in Patent No. 74,290, in which a copper block is notched to receive the edge of the can, and this notch is filled with solder which is kept in a melted condition by a flame beneath, while the can is soldered by simply turning its edge in the notch of the copper block.

In the patent referred to the copper block is placed in a horizontal position, and when so arranged the solder rests with a surface parallel with the top of the block, and adheres to both the side and head of the can. It is only necessary to have the solder adhere to the side of the can where the joint is, and hence that solder which adheres to the head of the can is wasted. Moreover, when the can is turned in the notch both sides of the notch are abraded and worn away, and the notch in the copper block is soon made so deep as to be useless.

My invention consists, first, in arranging the notched copper block in an inclined position, whereby the solder is made to rest principally against one side of the notch, and is mainly placed upon the side of the can where it is needed, thus securing an economy in the use of solder, and then combining with this inclined notched block means for adjusting the same, so that as fast as the notch wears away on one side it may be adjusted farther up the incline.

The invention consists, also, in combining with the inclined notch-block a gage or guard plate for determining the position of the can in the notch, as hereinafter fully described.

In the drawings, A represents a sheet-iron box or hood adapted to rest over a flame or charcoal fire, and having an inclined top, B, beneath which is arranged the copper block C. This block C is provided with a notch, $a$, of sufficient depth to hold solder enough for one can, and its upper surface is parallel with the surface B, or inclined so as to cause the solder to rest against the lower side of the notch without rising to the top of the notch on the other side. The notch in this copper block registers with an opening, $o$, in the inclined top B of the box, while the block slides in guides $b$ beneath the top B, and is held between blocks $b^2\ b^3$, and is adjusted up the incline, as the lower edge of the notch wears away, by means of the set-screws $c\ c$, which swivel in nuts $d$ in the frame-work of the box and bear either directly or indirectly against the copper block.

Now it will be seen that as the block wears away the notch does not wear in a deep hole, but wears away at one side only, wearing laterally and preserving the same depth, as shown in dotted lines in Fig. 3. As the block thus wears away it is adjusted up the incline by the set-screws.

In order to hold the can while being soldered in proper relative position with respect to the lower side of the notch, a sliding gage-plate, D, is arranged in guides $p$ on the inclined surface of the box, against which plate the end of the can rests to determine the proper inclination and position of the can.

Having thus described my invention, what I claim as new is—

1. A soldering device for cans, consisting of a copper block having a notch therein, a frame-work having inclined guideways for containing the copper block, and means for adjusting the latter, substantially as described.

2. The combination, with a frame-work carrying a notched copper block and means for adjusting the same on an incline, of a gage for determining the position of the can to the notch, substantially as shown and described.

ALDEN BRADFORD RICHARDSON.

Witnesses:
H. A. RICHARDSON,
W. J. WILSON.